(12) United States Patent
Johnson et al.

(10) Patent No.: US 9,808,020 B2
(45) Date of Patent: Nov. 7, 2017

(54) SYSTEMS AND METHODS FOR OZONE TREATMENT OF TOXIN IN GRAIN

(75) Inventors: Kevin C. Johnson, Pocatello, ID (US); Lynn Johnson, American Falls, ID (US); Delron E. Albert, Aberdeer, ID (US); Vane Case, Blackfoot, ID (US)

(73) Assignee: Archer Daniels Midland Co., Decatur, IL (US)

( * ) Notice: Subject to any disclaimer, the term of this patent is extended or adjusted under 35 U.S.C. 154(b) by 707 days.

(21) Appl. No.: 12/716,298

(22) Filed: Mar. 3, 2010

(65) Prior Publication Data

US 2011/0151080 A1  Jun. 23, 2011

Related U.S. Application Data

(63) Continuation-in-part of application No. 12/645,279, filed on Dec. 22, 2009.

(51) Int. Cl.
*A23B 9/18* (2006.01)
*A23L 3/3409* (2006.01)

(52) U.S. Cl.
CPC .............. *A23B 9/18* (2013.01); *A23L 3/3409* (2013.01); *A23V 2002/00* (2013.01)

(58) Field of Classification Search
None
See application file for complete search history.

(56) References Cited

U.S. PATENT DOCUMENTS

| 1,220,160 A | 3/1917 | Moore |
| 1,267,204 A | 5/1918 | Frick |
| (Continued) | | |

FOREIGN PATENT DOCUMENTS

| JP | 4200749 | 7/1992 |
| KR | 20020076831 A | 10/2002 |
| (Continued) | | |

OTHER PUBLICATIONS

Kells, Steven A., Efficacy and Fumigation Characteristics of Ozone in Stored Maize, Journal of Stored Product Research, Sep. 2000, vol. 37, pp. 371-382.

(Continued)

*Primary Examiner* — D Lawrence Tarazano
*Assistant Examiner* — Stephanie Cox
(74) *Attorney, Agent, or Firm* — Andrew F. Nilles

(57) ABSTRACT

Methods and systems for treatment of grain in a storage container using ozone may be used for treating grain for toxins, insects, mold, and/or odor. Downdraft methods for applying high concentrations of ozone to grain in a storage container treat grain without generating ozone-related objectionable odors or with generation of only minimal ozone-related objectionable odors. A method for downdraft ozone treatment of grain with minimal generation of ozone-related objectionable odors involves providing a negative air pressure at a bottom of a volume of grain in a storage container. A high ozone concentration is generated in air above an upper surface of the volume of grain. The ozone is drawn down into the volume of grain using the negative air pressure for a treatment time sufficient to effectively treat the grain without causing significant ozone-related commercially-objectionable foreign odors in the grain.

12 Claims, 5 Drawing Sheets

(56) References Cited

U.S. PATENT DOCUMENTS

| | | | |
|---|---|---|---|
| 3,918,404 | A | 11/1975 | Bunger |
| 4,454,807 | A | 6/1984 | Wolstenholme |
| 4,549,477 | A | 10/1985 | McCabe, Jr. |
| 4,726,286 | A | 2/1988 | Anderson |
| 4,795,651 | A | 1/1989 | Henderson et al. |
| 4,887,400 | A | 12/1989 | Carroll |
| 4,954,321 | A | 9/1990 | Jensen |
| 5,181,616 | A * | 1/1993 | Le Gigan .................. 209/31 |
| 5,263,896 | A | 11/1993 | Carroll |
| 5,326,543 | A | 7/1994 | Fiorenzano, Jr. |
| 5,403,441 | A | 4/1995 | McDonald |
| 5,700,505 | A | 12/1997 | Hurst |
| 6,387,241 | B1 | 5/2002 | Murphy et al. |
| 7,138,145 | B2 | 11/2006 | Walker |
| 7,351,373 | B2 | 4/2008 | Ried et al. |
| 7,818,894 | B2 | 10/2010 | Noyes et al. |
| 2005/0112209 | A1* | 5/2005 | Walker et al. ................ 424/600 |
| 2006/0062818 | A1 | 3/2006 | Walker et al. |
| 2007/0134380 | A1* | 6/2007 | Vetter et al. .................. 426/320 |
| 2009/0094853 | A1 | 4/2009 | Noyes et al. |
| 2009/0117016 | A1 | 5/2009 | Decker et al. |
| 2009/0191091 | A1 | 7/2009 | Danchenko et al. |

FOREIGN PATENT DOCUMENTS

| | | |
|---|---|---|
| WO | 2011087853 A3 | 7/2011 |
| WO | 2011087856 A3 | 7/2011 |

OTHER PUBLICATIONS

Herrman, Timothy J., Integrated Pest Management in Grain Storage and Feed Mills, ASA Technical Bulletin, vol. FT47, 1998.
Sopher, Charles D., Studies on the Use of Ozone in Production Agriculture and Food Processing, International Ozone Association, 2002.
Maier, Food Grains Ozonation—A New Stored Product IPM Pest Control Technology, Purdue University.
Maier, D., Modeling Airflow in Outdoor Grain Pile Aeration Systems, PS10-7-6159.
Maier, D.E., Ozonation as a Non-Chemical Stored Product Protection Technology, PS7-14-6162.
Hipolito de Sousa, Adalberto, Ozone as Alternative to Manage Phosphine-Resistant Populations of Rhyzopertha Dominica, IOA Conference and Exhibition Valencia, Spain, Oct. 2007.
Mendeza et al, Penetration of ozone into columns of stored grains and effects on chemical composition and processing performance, Journal of Stored Products Research, vol. 39, Issue 1, 2003, pp. 33-44.
O3Co, Ozonation, www.O3co.com, Milling Journal, 2004. p. 67.
Maitree et al, Prevention and control of mycotoxins, Agriculture and Consumer Protection, www.fao.org/docrep/x5036e/x5036E0q.htm, Jul. 24, 2012.
Feed&Grain, Your information resource for profitable growth, The State of Badger State, Apr./May 2004pp. 18-21, www.feedandgrain.com.
Steeves, This Products Proving Safe for use in Grains, Ozone Updates, Potato Grower, Feb. 2004, p. 60.
Saint Paul, Comparative effects of two ozonation treatments on wheat flour technological properties, K-R Ex Research Exchange, 2007.
McClurkin et al, Control of stored grain fungi and off odors with ozone in a grain treatment system, ProQuest Dissertations & Theses, Purdue University, 2009, 128 pages; AAT 1470162.
Dubois et al, Safety of Oxygreen , an ozone treatment on wheat grains, FSTA Direct, Food Additives and Contaminants 23 (1) 1-15, Apr. 10, 2010.
Mycotoxin prevention and control in foodgrains, Corporate Document Repository, 1989, www.fao.org/docrep/X5036E/X5036E00.htm.

* cited by examiner

SYSTEMS AND METHODS FOR OZONE TREATMENT OF TOXIN IN GRAIN

CROSS-REFERENCE TO RELATED APPLICATIONS

This application is a continuation-in-part of prior application Ser. No. 12/645,279, filed Dec. 22, 2009, which is incorporated herein in its entirety by reference.

BACKGROUND OF THE INVENTION

1. Field of the Invention

The present invention relates to grain treatment, and more particularly to systems and methods for treating toxins in grain with ozone.

2. Background and Related Art

Many types of grain are grown for human and animal consumption and use. The condition of the grain is often affected by the growing conditions, and when the grain is harvested, it may be found to contain insects, mold and/or bacteria, unwanted odors, and/or toxins remaining from the presence of molds and the like. Additionally, once grain has been harvested, it often is stored for some time prior to final distribution and use. During times of storage, existing problems with the grain can be exacerbated. Depending on the extent and severity of the odor, mold, or toxin problems, the value of the grain can be slightly to greatly reduced.

Several forms of mycotoxins can be found in harvested and/or stored grain, including vomitoxin, aflatoxin, and fumonisin. These toxins are residues left behind by molds that may no longer be present in the grain. Certain conditions during certain periods of the grain growth cycles encourage mold growths, and the toxins are the after-products of that growth. It is essentially impossible to spray or treat the growing grain in such a way as to treat or prevent the mold outbreaks. Therefore, farmers generally have to hope for favorable growing conditions that do not encourage mold proliferation.

In Europe, statutory levels of a range of mycotoxins permitted in food and animal feed are set by a range of European directives and Commission regulations. The U.S. Food and Drug Administration has regulated and enforced limits on concentrations of mycotoxins in foods and feed industries since 1985. Vomitoxin is a common problem in smaller grains such as wheat and barley. Aflatoxin is affects the marketability of corn and peanuts. Fumonisin is problematic in corn crops.

BRIEF SUMMARY OF THE INVENTION

Implementation of the invention provides methods and systems for treatment of grain in a storage container using ozone. Treatment of grain with ozone according to implementation of the invention may be effective for treating grain for toxins, insects, mold, and/or odor. Implementation of the invention utilizes downdraft methods for applying high concentrations of ozone to grain in a storage container. The systems and methods treat grain without generating ozone-related objectionable odors or with generation of only minimal ozone-related objectionable odors.

A method for downdraft ozone treatment of grain with minimal generation of ozone-related objectionable odors according to implementations of the invention involves providing a negative air pressure at a bottom of a volume of grain in a storage container. A generated ozone concentration exceeding 100 parts per million (ppm) is generated in air above an upper surface of the volume of grain. The ozone is drawn down into the volume of grain using the negative air pressure for a treatment time sufficient to effectively reduce toxins in the grain without causing significant ozone-related commercially-objectionable foreign odors in the grain.

Implementations of the invention utilize higher concentrations of ozone than previously known in the art, such as concentrations over 100 ppm. Some implementations utilize concentrations exceeding 200 ppm, such as concentrations between 200 and 800 ppm. Certain implementations utilize concentrations of approximately 500 ppm. Using such concentrations, the treatment time may be between approximately three and approximately six hours.

In some implementations, ozone may be applied in a stepped concentration profile. For example, a first ozone concentration may be generated and applied for a first period of time, and a second, decreased, ozone concentration that is lower than the first concentration may be generated and applied for a second period of time. In such implementations, the treatment time incorporates the first period of time and the second period of time. The changing ozone concentrations may be achieved by varying air flow through the grain, such that air flow is greater during the second period of time, effectively reducing the ozone concentration.

Another method for treating grain with ozone while minimizing generation of ozone-related objectionable odors in the grain in accordance with implementation of the invention involves supplying a high concentration of ozone to grain stored in a storage container, the high concentration of ozone exceeding 100 ppm. The high concentration of ozone is drawn through the grain for a period of time less than twelve hours. Using high concentrations of ozone for short periods of time has been found to reduce commercially-objectionable odors while still effectively treating the grain, when compared with old treatment methods that sought to minimize the concentration of ozone and utilize long treatment times.

Another method for treating grain with ozone while minimizing generation of ozone-related objectionable odors in the grain in accordance with implementation of the invention includes supplying ozone above an upper surface of a volume of grain in a storage container and drawing ozone mixed with air into the grain in the storage container at a first rate. After a first period of time has passed, the rate at which ozone mixed with air is drawn into the grain in the storage container is increased to a second rate, and this second rate is maintained for a second period of time.

The methods disclosed herein may be terminated at appropriate times, such as after detection of a desired quantity of ozone passing through a bottom of the grain. Alternatively, the methods may be terminated upon detection of a beginning of an undesired ozone-caused odor in the grain. In at least some implementations, the grain from the storage container is extracted and mixed. This ensures that the mixed grain is evenly treated and that any remaining odors, toxins, etc. are evenly distributed throughout the grain, which can then be evaluated for value as a unit.

Implementation of the methods disclosed herein may be used to treat large quantities of grain, such as grain in the storage container having a height of grain reaching approximately forty feet high or more, such as to eighty feet high.

BRIEF DESCRIPTION OF THE SEVERAL VIEWS OF THE DRAWINGS

The objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described and explained with additional specificity and detail through the use of the accompanying drawings in which:

DETAILED DESCRIPTION OF THE INVENTION

Figure 1:
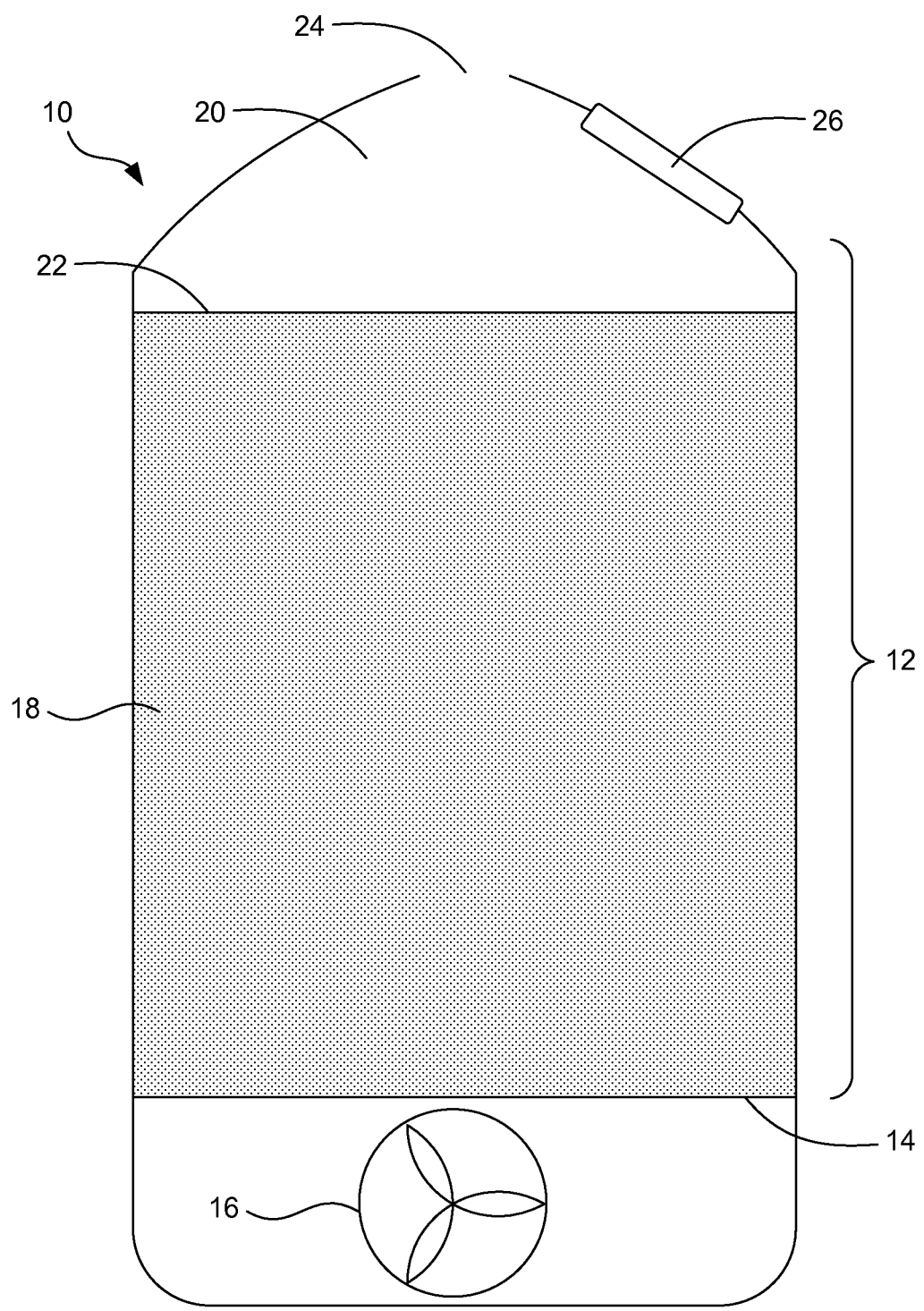
FIG. 1 shows a depiction of grain in a storage container according to embodiments of the invention.

A description of embodiments of the present invention will now be given with reference to the Figures. It is expected that the present invention may take many other forms and shapes, hence the following disclosure is intended to be illustrative and not limiting, and the scope of the invention should be determined by reference to the appended claims.

Embodiments of the invention provide methods and systems for treatment of grain in a storage container using ozone. Treatment of grain with ozone according to embodiments of the invention may be effective for treating grain for toxins, insects, mold, and/or odor. Embodiments of the invention utilize downdraft methods for applying high concentrations of ozone to grain in a storage container. The systems and methods treat grain without generating ozone-related objectionable odors or with generation of only minimal ozone-related objectionable odors.

A method for downdraft ozone treatment of grain with minimal generation of ozone-related objectionable odors according to embodiments of the invention involves providing a negative air pressure at a bottom of a volume of grain in a storage container. A generated ozone concentration exceeding 100 parts per million (ppm) is generated in air above an upper surface of the volume of grain. The ozone is drawn down into the volume of grain using the negative air pressure for a treatment time sufficient to effectively reduce toxins in the grain without causing significant ozone-related commercially-objectionable foreign odors in the grain.

Embodiments of the invention utilize higher concentrations of ozone than previously known in the art, such as concentrations over 100 ppm. Some embodiments utilize concentrations exceeding 200 ppm, such as concentrations between 200 and 800 ppm. Certain embodiments utilize concentrations of approximately 500 ppm. Using such concentrations, the treatment time may be between approximately three and approximately six hours.

In some embodiments, ozone may be applied in a stepped concentration profile. For example, a first ozone concentration may be generated and applied for a first period of time, and a second, decreased, ozone concentration that is lower than the first concentration may be generated and applied for a second period of time. In such embodiments, the treatment time incorporates the first period of time and the second period of time. The changing ozone concentrations may be achieved by varying air flow through the grain, such that air flow is greater during the second period of time, effectively reducing the ozone concentration.

Another method for treating grain with ozone while minimizing generation of ozone-related objectionable odors in the grain in accordance with embodiments of the invention involves supplying a high concentration of ozone to grain stored in a storage container, the high concentration of ozone exceeding 100 ppm. The high concentration of ozone is drawn through the grain for a period of time less than twelve hours. Using high concentrations of ozone for short periods of time has been found to reduce commercially-objectionable odors while still effectively treating the grain, when compared with old treatment methods that sought to minimize the concentration of ozone and utilize long treatment times.

Another method for treating grain with ozone while minimizing generation of ozone-related objectionable odors in the grain in accordance with embodiments of the invention includes supplying ozone above an upper surface of a volume of grain in a storage container and drawing ozone mixed with air into the grain in the storage container at a first rate. After a first period of time has passed, the rate at which ozone mixed with air is drawn into the grain in the storage container is increased to a second rate, and this second rate is maintained for a second period of time.

The methods disclosed herein may be terminated at appropriate times, such as after detection of a desired quantity of ozone passing through a bottom of the grain. Alternatively, the methods may be terminated upon detection of a beginning of an undesired ozone-caused odor in the grain. In at least some embodiments, the grain from the storage container is extracted and mixed. This ensures that the mixed grain is evenly treated and that any remaining odors, toxins, etc. are evenly distributed throughout the grain, which can then be evaluated for value as a unit.

Embodiments of the methods disclosed herein may be used to treat large quantities of grain, such as grain in the storage container having a height of grain reaching approximately forty feet high or more, such as to eighty feet high It is anticipated that systems and methods according to embodiments of the invention can be used to treat large amounts of grain in a relatively short period of time. As such, the following terms, when used in the description or claims should be given the following definitions:

Grain—this term shall mean any of a variety of crops that may contain toxins and/or odor and may benefit from (i.e. have toxin levels reduced by) treatment according to the systems and methods disclosed herein. The definition of grain shall include cereals such as wheat, maize/corn, barley, oats, rye, rice, and the like, and peanuts.

Toxin—this term shall mean any of a variety of toxins that can be treated using ozone according to embodiments of the present invention.

Odor—this term shall mean any of a variety of odors or smells that can be treated using ozone according to embodiments of the present invention.

Storage container—this term shall mean any of a variety of containers for containing or storing large quantities of grain for short or long duration and the like. Examples of storage containers include silos, bins, bins for grain drying such as corn drying bins, hopper bottom bins, and the like. Such storage containers are often round and have typical diameters ranging from approximately fifteen feet to approximately one hundred twenty feet.

Our prior application Ser. No. 12/645,279 discloses various updraft methods and systems of treating grain with ozone. One advantage of the methods and systems disclosed in that application is the ability to utilize substantially-continuous flow of grain being treated, which allows for effective treatment of very large quantities of grain. Another advantage is that ozone in such systems and methods may be entirely contained within a storage container and not allowed to escape through an upper surface of the grain in the storage container.

While those systems and methods have many benefits, some of those systems and methods involve certain difficulties. For example, it has been found that each different load of grain (even grain of the same type) has different characteristics, treatment needs, etc. and responds to the ozone treatment differently. Therefore, it can be difficult to properly control the ozone concentrations and flow rates to properly treat all the grain in the storage container, at least in batch situations. Additionally, it has been found that ozone being forced into the storage containers from below tends to move upward in channels in some instances. Thus, the grain in the channels receives significantly more ozone treatment than other portions of the grain, which may remain essentially untreated, minimally treated, or insufficiently treated. One way to deal with some of these problems as disclosed in our prior application is to flip the grain into another storage container so that ozone can interact with more of or a different portion of the grain.

While the updraft systems and methods disclosed in our prior application can be effective in many instances, many storage containers are not well suited or are not easily adequately adapted for use in such systems and methods. For example, many existing storage containers such as bins are not designed to provide a good up draft air flow from the bottom of the storage container. Such storage containers require significant modifications to function adequately in an up draft treatment modality. Similarly, many existing storage containers lack a mechanism to evenly distribute the grain as they are filled, which lack may reduce the effectiveness of the disclosed treatment.

With respect to the continuous flow systems and methods disclosed in our prior application, such systems and methods utilize first-in-first-out systems and mechanisms. Most existing storage containers do not have such systems. Thus, either significant modifications should be made to implement the continuous flow systems and methods we described, or new facilities should be built. Thus, there is a need for methods and systems that can be more easily adapted to existing storage containers.

Embodiments of the present invention utilize downdraft ozone treatment to treat grain. Downdraft treatment avoids some of the ozone channeling difficulties encountered in updraft systems. Downdraft treatment as described herein achieves good overall treatment of statically-stored grain in a storage container without any flipping of the grain from one container to another. Thus, embodiments of the invention are well-adapted for batch treatment of grain and for treatment of grain with only minimal to no modification of existing storage containers.

FIG. 1 shows a storage container 10 of a type that may be used with embodiments of the present invention. The elements of the storage container 10 (or other elements depicted in the Figures) are not necessarily shown to scale in FIG. 1 or in subsequent Figures, instead being illustrated in a manner so as to enhance clarity of the Figures and the accompanying description. The storage container 10 includes a grain storage space 12 for storing grain. The storage contain 10 also includes an aeration floor 14. An alternative to the depicted aeration floor 14 is the presence of perforated tubes along the bottom of the storage container 10. The aeration floor 14 or perforated tubes allows air or other gases to pass through the aeration floor 14 or perforated tubes into the grain storage space 12 under positive air pressure, or to be withdrawn through the aeration floor 14 or perforated tubes from the grain storage space 12 under negative air pressure. The positive/negative pressure may be delivered by a fan 16 or any other device known in the art. Grain 18 is stored in the grain storage space 12, and can be treated in situ therein as discussed herein.

In embodiments of the invention, gaseous ozone is supplied to an air space 20 above an upper surface 22 of the grain 18 in the storage container 10. The gaseous ozone is supplied by one or more ozone generators (not shown in FIG. 1). The gaseous ozone mixes with air present in the air space 20. During the treatment process, additional air may enter the storage container 10 through an upper opening 24 or a vent 26 of the storage container 10, or through any other means, including non-airtight portions of the storage container 10. Meanwhile, air is drawn through the aeration floor 14 (e.g. downward) from the grain storage space 12 (e.g. by the fan 16), which causes the ozone generated and supplied to the air space 20 to enter the grain 18 through the upper surface 22.

The ozone may be delivered to the air space 20 in various concentrations and quantities, and it will be understood from this description and from practice of the invention that many different quantities and concentrations may be used to effectively treat the grain 18 in the storage space 12 with the ozone. Although specific concentrations and quantities of ozone may be discussed herein, it is deemed a matter of simple testing to determine what quantities and concentrations, along with associated times of treatment are effective in treating different grains for different kinds of toxins and/or odors, insects, molds, and the like, and it is therefore impossible to list herein all possible effective concentrations and quantities of ozone that may be used with embodiments of the invention for at least this reason. Additionally, it is further impossible to list all the possible concentrations and quantities of ozone and/or all times of treatment, as the definition of effective treatment varies from situation to situation.

For example, in one situation, a particular sample of grain may be determined to have a certain concentration "A" of a particular toxin/odor/etc., and it may be determined that after treatment, the concentration of toxin/odor/etc. should be reduced to level "B." In another situation, however, the initial concentration may be of level "C" (either higher or lower than levels "A" and/or "B") and that the needed final concentration is of level "D" (that may also be either higher or lower than levels "A" and/or "B"). As may be appreciated, these various situations and final levels may be advantageously obtained with different amounts or concentrations of ozone for different treatment times, but all such treatment times and ozone concentrations/amounts are embraced by embodiments of the invention, whether or not specifically listed herein.

Nevertheless, and by way of example only, certain embodiments of the invention utilize relatively high concentrations of ozone. In the past, ozone treatment of organic products such as grain has focused on the use of low concentrations of ozone for long periods of time. For example, the treatment industry has typically used concentrations of ozone well below 50 ppm. Ozone is a strong oxidizing agent, which is what makes it so attractive for treating organic products such as grains. The oxidizing power of ozone (at sufficient quantities for sufficient times)

has been found to kill many types of organisms (e.g. insects, mold, etc.) and to oxidize and de-activate certain toxins and odor-causing compounds. One problem with ozone treatment, however, is that over-treatment with ozone leads to commercially-objectionable foreign odors (COFO) in the products being treated. Such COFO is a result of the ozone treatment. The industry has previously attempted to address this problem by reducing the concentrations of ozone used, which has necessitated an increase in the length of time of treatment to achieve the desired reductions in undesirable toxins/odors/etc. However, problems with COFO have remained despite continued efforts in this regard.

Certain embodiments of the invention address the problem of COFO by using high concentrations of ozone for comparatively short lengths of time. For example, embodiments of the invention utilize concentrations of ozone exceeding 100 ppm. Certain embodiments of the invention have been effectively utilized with ozone concentrations in the range of approximately 200-800 ppm for treatment times of roughly two hours to eight hours. As another example, embodiments of the invention have been found effective with concentrations of approximately 500 ppm for treatment times of approximately three hours to four hours. In some instances, lower concentrations and/or lower treatment times than 200 ppm and two hours and/or higher concentrations and/or treatment times than 800 ppm and eight hours may be used. For example, in instances where ozone delivery and air flow is less than uniform or is less than completely delivered to all areas of the grain, it may be desirable to increase ozone concentrations and/or treatment times to ensure all grain is satisfactorily treated. Thus the specific examples discussed above are given by way of example only, and are not considered to be limiting.

Figure 2:
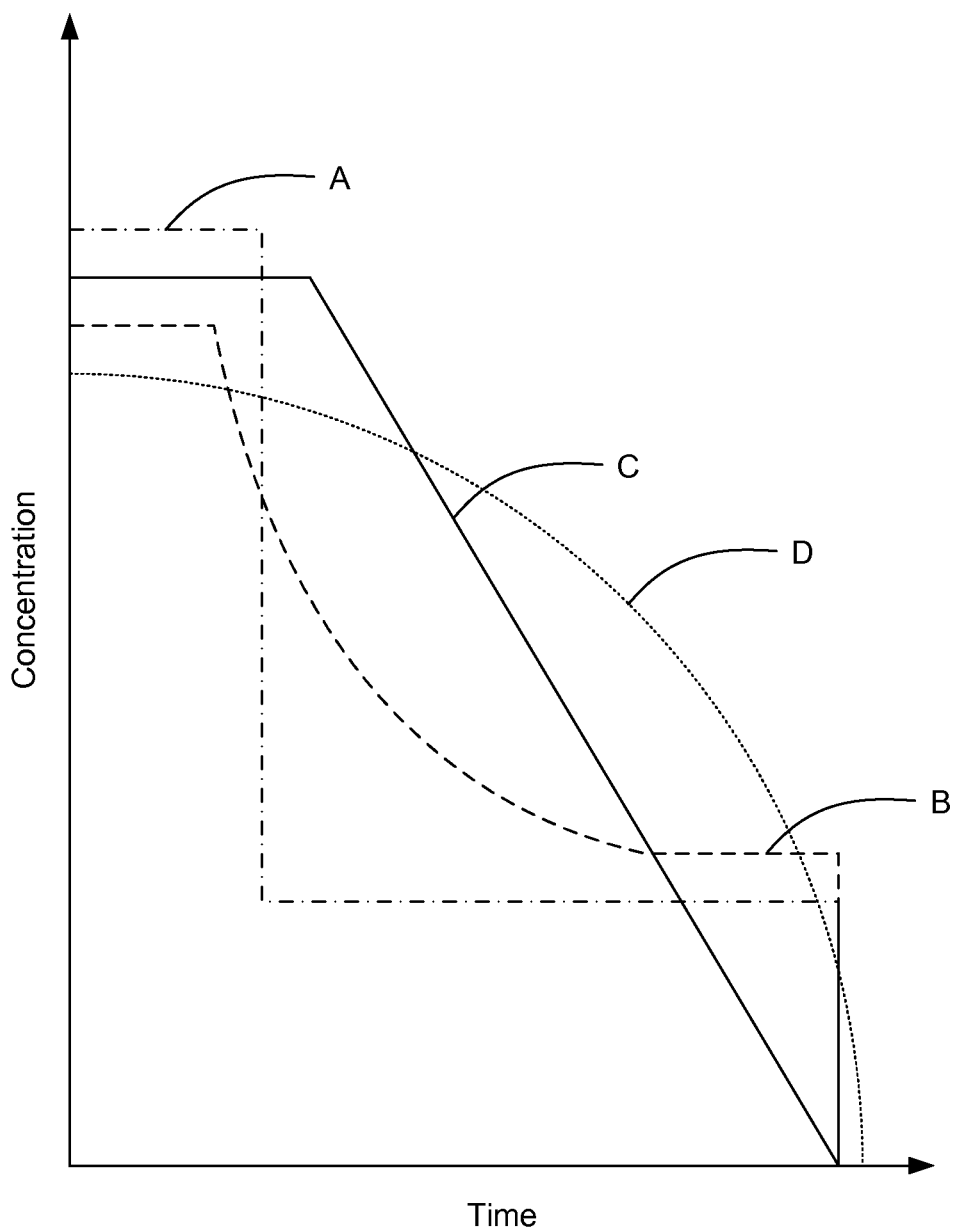
FIG. 2 shows a depiction of various ozone concentration curves that may be used in embodiments of the invention.
Figure 5:
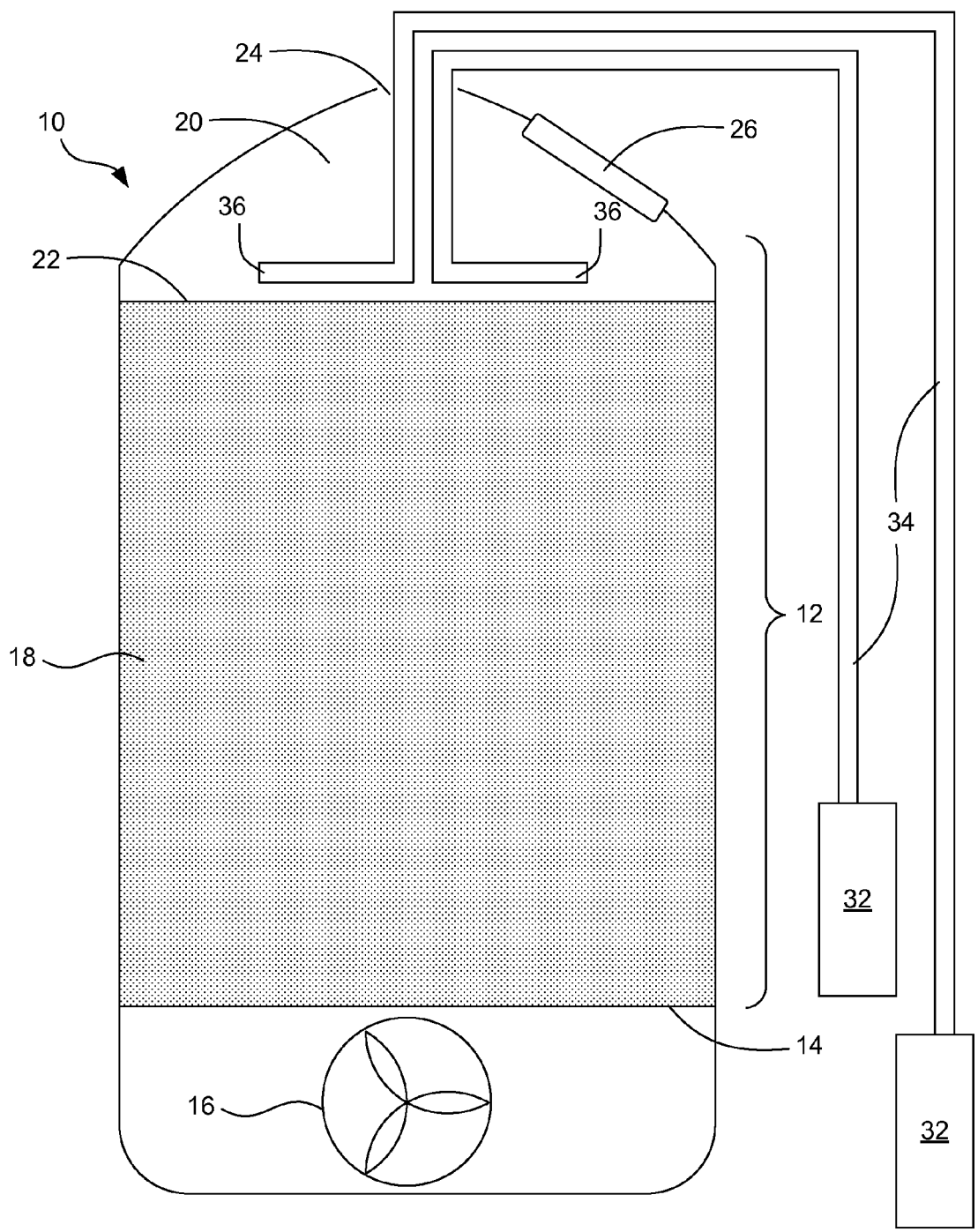
FIG. 5 shows a depiction of a treatment system according to certain embodiments of the invention.

Certain embodiments of the invention utilize a stepped profile of ozone application as a mechanism for addressing the COFO problem. In such embodiments, ozone is applied at an initial higher concentration for a first portion of a treatment, and is then applied at a lower concentration for a second portion of a treatment. Concentration profile "A" shown in FIG. 2 illustrates this manner of ozone treatment. The concentration is shown in FIG. 2 as measured in the air space 20 during treatment. It is envisioned that ozone concentrations may be varied in a variety of manners during the course of treatment, and that it may be discovered that certain concentration profiles over time are effective for treatment of certain conditions to be treated (e.g. certain types of mold, certain types of odor, certain types/concentrations of toxins, etc.). Thus, FIG. 5 illustrates additional concentration profiles in which ozone is applied at an initial high concentration for a first period of time after which the ozone concentration is lowered.

For example, concentration profile "B" has an initially-higher ozone concentration that gradually decreases to a lower ozone concentration with an initially-steeper concentration change. In contrast, concentration profile "C" has an initially higher ozone concentration that gradually decreases to approximately zero (or to some other lower ozone concentration) approximately linearly. Concentration profile "D" decreases over a gradual curve. These concentration profile examples are intended to be exemplary only, and embodiments of the invention embrace a variety of concentration profile changes with delivery of an initially-higher ozone concentration followed by delivery of a lower ozone concentration.

Changes in ozone concentration such as depicted by the concentration profiles illustrated in FIG. 2 may be achieved in a variety of fashions. In one type of method, concentration changes are achieved by varying the rate at which air is drawn out through the aeration floor 14 by the fan 16. Thus, for example, with respect to concentration profile "A" shown in FIG. 2, a relatively-constant or substantially-constant amount of ozone may be generated and supplied to the air space 20 by one or more ozone generators and delivery systems (as discussed below in more detail with respect to FIG. 5). During the time when the ozone concentration is high, a rate of speed or air flow rate of the fan 16 may be at a certain low level. At a later time, the speed of the fan 16 or speed at which the fan 16 is moving air is increased, which leads to more air entering the storage container 10 (such as through the upper opening 24 and/or vents 26), which naturally leads to a decreased ozone concentration level. Essentially any concentration profile may be achieved by way of variation in the amount of air moving downward through the grain 18 and the aeration floor 14 as controlled by the fan 16 (or other corresponding structure).

Another way to generate varying concentrations of ozone in the air space 20 is to generate and supply different amounts of ozone to the air space 20, with or without varying the speed of gas flow through the grain 18 in the storage container 10. If the speed of gas flow is unchanged throughout, then the change in concentration is largely dependent on the amount of ozone generated and delivered to the air space 20. If, however, the speed of gas flow also changes (e.g. the fan speed changes, etc.), then the profile of the change in concentration is a result of the combination of the change in the amount of delivered ozone (by molecules, weight, etc.) and the change in gas/air flow.

As described above, the concentration profiles depicted in FIG. 2 are intended to illustrate concentrations as measured in the air space 20 just above the upper surface 22 of the grain 18. With any such concentration profile, the measured concentrations at any particular depth in the grain 18 may be significantly different from the profiles illustrated in FIG. 2. For example, it may take some time for the ozone to reach lower portions of the grain 18. Thus, the measured concentration at such lower portions of the grain may be essentially zero for much of the treatment time. Similarly, once delivery of ozone to the air space stops 20, there may be a significant amount of ozone still in the grain 18 and being withdrawn by the fan 16 (or other corresponding device), and it may take some time before the ozone concentration in lower portions of the grain reaches zero or nearly zero.

As it is desirable to have as much of the grain 18 as possible exposed to ozone so as to treat as much of the grain 18 effectively as possible, it is desirable to ensure that ozone passes all the way through the grain 18. If necessary, any excess ozone passing through the aeration floor 14 may be passed through an ozone destruct module or device of any suitable type known in the art. It is currently believed that initially higher concentrations of ozone assist the ozone in moving through the entire volume of the grain 18 more thoroughly.

Testing of embodiments of the invention has shown that the use of relatively high concentrations of ozone and for relatively short periods of time achieve effective treatment of the grain 18 with minimal generation of COFO. For example, in certain tests (it should be remembered that each batch of grain to be treated has different characteristics and response to treatment), it was determined that significant desired oxidation of toxins was achieved at approximately three to four hours of ozone treatment, and that significant development of COFO was not noticed until approximately six hours of ozone treatment.

Testing of embodiments of the invention has also shown that the use of initially-higher concentrations of ozone in the air space 20 followed by lowering of the ozone concentration (such as by increasing the air flow) also aids in successful treatment of the grain 18 with minimal generation of COFO. The exact mechanisms for this success are not entirely known and are the subject of continued testing. Indeed, although much study has been done with ozone generally, there is still much to be learned regarding the effects of ozone treatment and what mechanisms and concentrations of treatment are most effective in each situation. Nevertheless, it is believed that the initially-higher levels of ozone assist the ozone in more-efficiently travelling through the entire volume of the grain 18 to the lower portions of the grain 18.

Because the time of treatment and possible concentration ranges are so variable, in part due to the variety of storage containers 10, variety of grains to be treated, variety of reasons for treatment (odor, toxin, mold, insects, etc.), variety of achievable concentration ranges and air flow speeds, etc., it is impossible to list herein all possible variations in treatment that may be used with embodiments of the invention. Suffice it to say that all such variations falling within the scope of the claims are embraced by the embodiments of the invention. While the updraft methods of ozone treatment disclosed in our prior application have certain advantages, it has been found through experimentation that such methods, while functional, are subject to certain inadequacies that are best addressed by careful monitoring of concentrations and effects to ensure proper treatment. In contrast, it has been found that embodiments of the present invention function well over a greater range of variations in the applied concentrations, air flows, and time periods.

In addition, because embodiments of the invention minimize or obviate the need for "flipping" the grain 18 from one storage container 10 to another storage container 10 for further treatment, the economies of batch treatment according to embodiments of the invention are improved. It is anticipated that the cost of batch treatment according to embodiments of the present invention falls within the range of one third to one half the cost of batch treatment according to the invention disclosed in our prior application.

With embodiments of the present invention, the treatment may be ended according to a variety of factors relating to effective treatment with minimal generation of COFO. In certain instances, as dictated by the circumstances of each treatment, the treatment (e.g. the continued delivery of additional ozone to the air space 20) may be ended before ozone has completely passed through the grain 18, and lower portions of the grain 18 may remain unexposed to ozone or may have been exposed only to relatively small amounts of ozone. In other instances, the treatment (e.g. continued delivery of additional ozone to the air space 20) may be ended based on detection of certain quantities of ozone exiting through the aeration floor 14. Even so, portions of the grain 18 may have been exposed to relatively smaller amounts of ozone. In still other instances, the treatment (e.g. continued delivery of additional ozone to the air space 20) may be terminated based upon detection of a certain level of COFO in the grain 18 or in the air passing through the aeration floor 14. Once a certain level of COFO has been detected, continued treatment with ozone is considered to be detrimental to the value of the grain 18.

Regardless of when the treatment is ended, it is likely that not all the grain 18 will have been exposed to/treated equally by the ozone. In grain being treated for toxin, for example, it is expected that certain portions of the grain 18 will have relatively higher concentrations of toxin than other portions of the grain 18. Similarly, where some COFO has been generated in the grain 18, it is expected that certain portions of the grain 18 will have relatively more COFO than other portions. To maximize the value of the grain 18, embodiments of the invention embrace mixing of the grain 18 after treatment (e.g. upon removal from the storage container 10 for use). Generally, this results in an overall higher quality of the grain 18 at sale.

Figure 3:
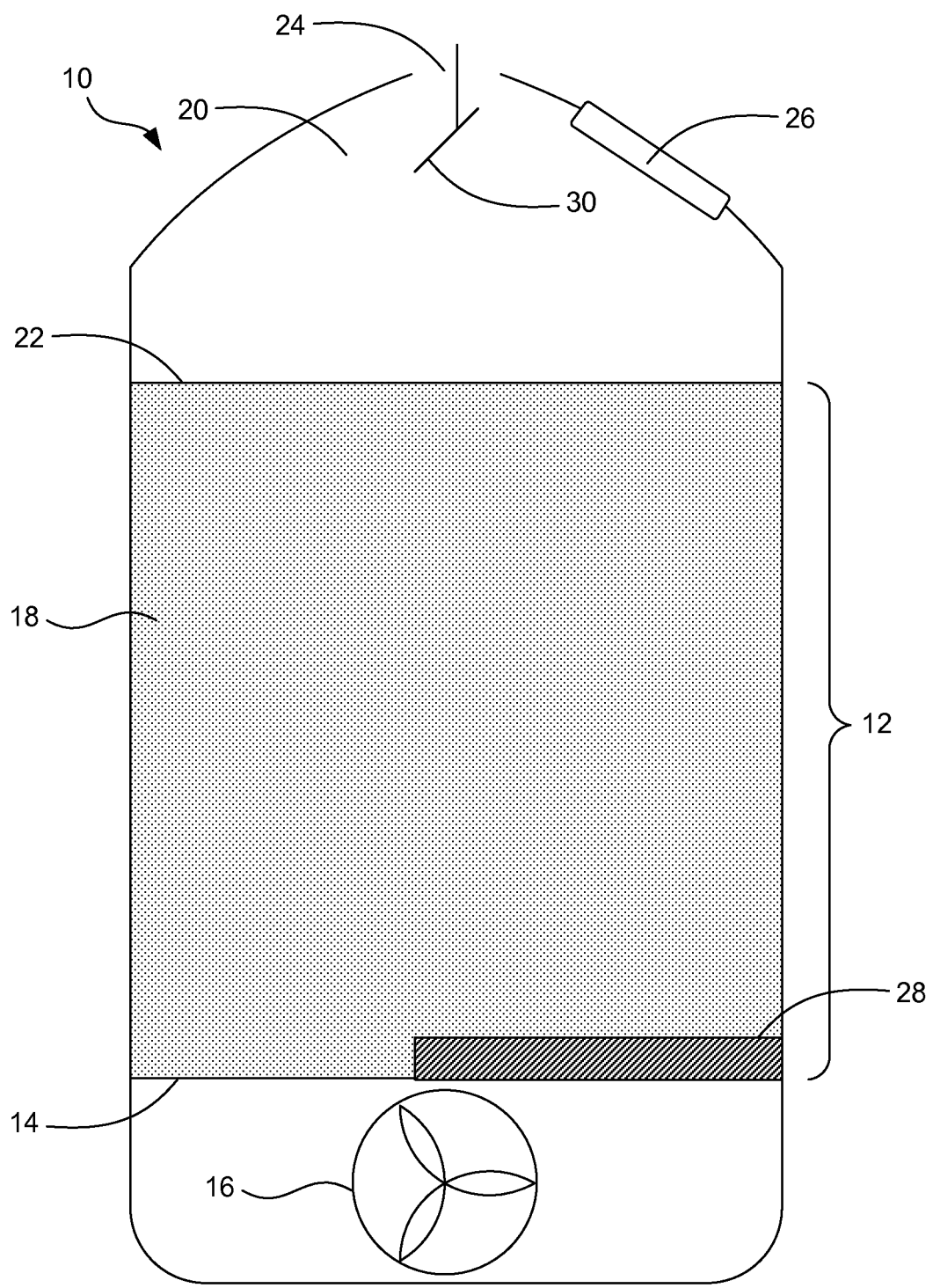
FIG. 3 shows a depiction of grain in an alternative storage container according to certain embodiments of the invention.

Turning to other examples of embodiments of storage containers that can be adapted for use with embodiments of the invention, FIG. 3 illustrates another storage container 10 that is configured to provide first-in-first-out (FIFO) passage of the grain 18 through the storage container 10. Although certain embodiments of the invention disclosed in our prior application utilized mechanisms providing FIFO grain passage, the embodiments of the present invention do not rely on FIFO methods to provide the functionality of the present invention. Thus, FIG. 3 merely illustrates that embodiments of the invention may be practiced using any type of storage container 10, including storage containers 10 adapted to provide FIFO grain passage. It is even envisioned that downdraft ozone treatment according to embodiments of the invention may be used with continuous-flow treatment systems as disclosed in our prior application.

In the storage container 10 illustrated in FIG. 3, a mechanism 28 for removing a lowermost portion of the grain 18 in the grain storage area 12 is provided. The mechanism 28 for removing a lowermost portion of the grain 18 is one of any of a variety of such systems or mechanisms currently known in the art or later invented, including a variety of grain or silo reclaimers, such as a sweep auger, a tapered sweep auger, a bin sweep, a ring drive reclaimer, a center drive reclaimer, a conical hopper reclaimer, and the like. In some embodiments, the storage container 10 is shaped so as to encourage FIFO passage of the grain through the storage container 10 without using a mechanical device. In such embodiments, the mechanism 28 may be the geometric configuration of the storage container 10 itself. The presence or absence of the mechanism 28 is not deemed to have significant effect on functioning of embodiments of the invention.

The storage container 10 of FIG. 3 also includes a grain spreader 30, which is any type of spreader now known or later invented for evenly spreading grain in the storage container 10, such as a motorized bin level, a gravity flow spreader, cone spreaders, and the like. The grain spreader 30 adds new grain on top of an uppermost portion of the grain 18 in the grain storage space 12 relatively evenly, instead of allowing it to pile up with a significant peak. In updraft ozone treatments such as disclosed in our prior application, the avoidance of piling and peaking of the grain provided certain advantages, as it ensured more-even treatment of the grain 18. In embodiments of the current invention, however, piling and peaking is less of a concern, as the ozone is originally delivered to the air space 20, and any of the grain 18 in the peak is exposed to the ozone in the air space 20.

Figure 4:
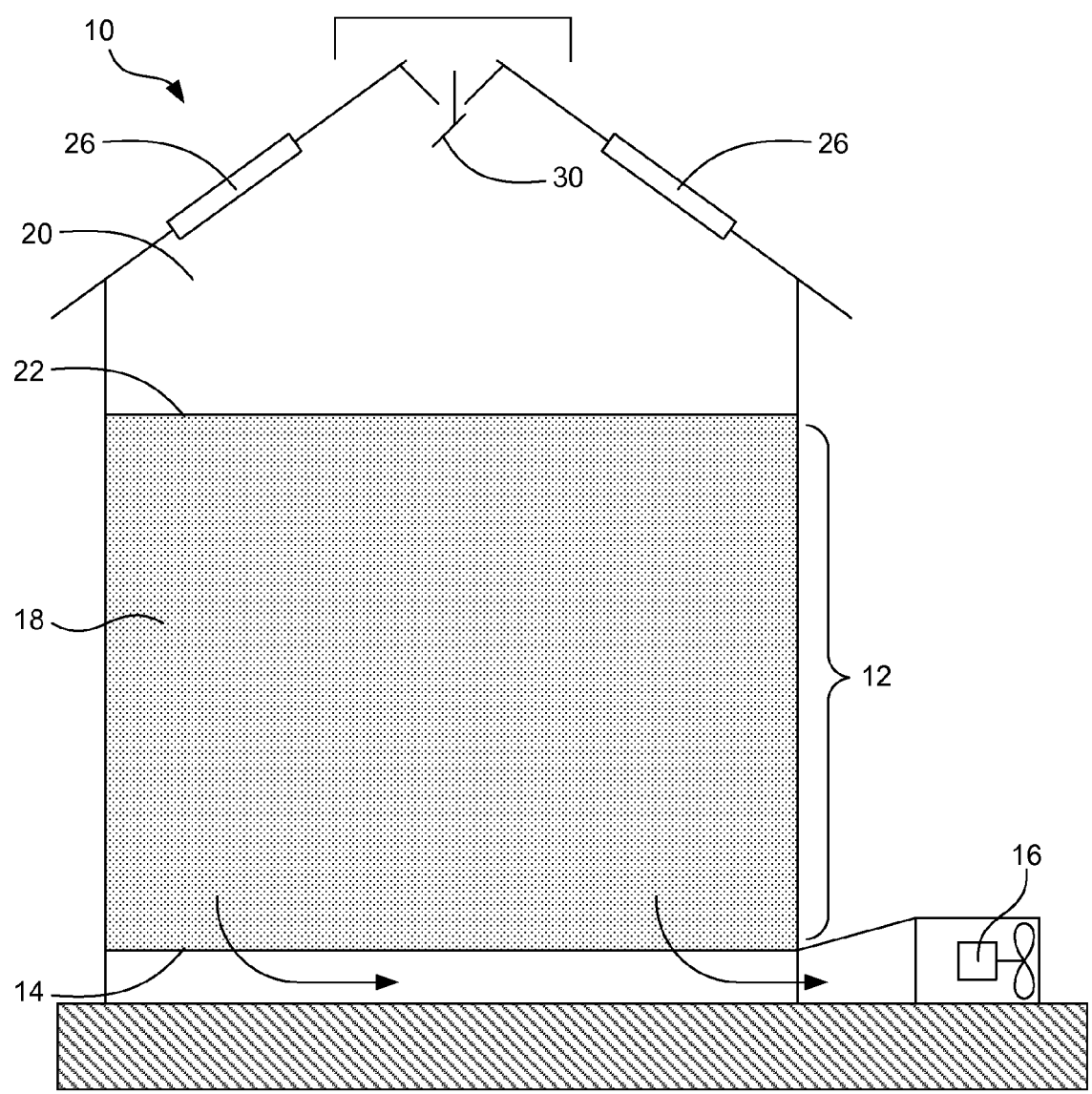
FIG. 4 shows a depiction of grain in an alternative storage container according to certain embodiments of the invention.

Embodiments of the invention embrace the treatment of grain in any of a variety of storage containers 10 (such as silos, corn drying bins and the like), and only a single storage container 10 is used in the process. For example, FIG. 4 shows a depiction of an exemplary single corn drying bin as a storage container 10 for use with embodiments of the invention.

Storage containers 10 of the types illustrated in FIGS. 1-3 can be used to treat large quantities of grain according to embodiments of the invention. For example, many storage containers 10 have diameters on the order of approximately thirty to one hundred twenty feet or more. Embodiments of the invention may be used to treat the grain 18 in such storage containers 10 to depths above approximately forty feet. In fact, it is currently believed that grain depths in the storage containers 10 may reach eighty feet or more and be effectively treated using embodiments of the invention.

FIG. 5 shows an exemplary depiction of a storage container adapted for ozone treatment as discussed herein. One or more ozone generators 32 is/are used to generate ozone for delivery to the air space 20 of the storage container 10. The one or more ozone generators 32 is/are sized to provide sufficient ozone to achieve the desired ozone concentrations. For example, some embodiments utilize ozone generators 32 capable of generating up to approximately two kilograms of ozone per hour. Other embodiments utilize ozone generators 32 capable of approximately double that capacity, or capable of generating up to approximately four kilograms of ozone per hour. Of course, ozone generators 32 of different capacity may be used, and combined as necessary to achieve a desired concentration of ozone in the air space 20 under certain desired conditions.

As one example, consider a situation where it is desired to achieve an ozone concentration of approximately 500 ppm in the air space 20 just above the upper surface 22 when a particular air flow/negative pressure is achieved by the fan 16 through the aeration floor 14. The total amount of ozone to be generated and supplied by the ozone generator(s) 32 may be very different for a thirty-foot-diameter storage container 10 than it is for a one hundred twenty-foot-diameter storage container 10. Thus, different ozone generation capacities may be needed for different situations. In one situation, ozone generation capacity of only approximately one kilogram per hour may be sufficient, where in another situation, ozone generation capacity of approximately four or more kilograms per hour may be needed. If a single ozone generator 32 lacks sufficient capacity for a desired use with embodiments of the invention, multiple smaller ozone generators 32 may be used. Thus, embodiments of the invention embrace the use of ozone generators 32 of greatly-varying capacities.

The ozone generated by the one or more ozone generators 32 is delivered to the air space 20 by an ozone distribution system 34. The ozone distribution system 34 terminates in one or more outlets 36. The outlets 36 may be more-or-less permanently-disposed within the storage container 10, or they may be selectively-removable from the storage container 10. In embodiments where the outlets 36 are more-or-less permanently-disposed within the storage container 10, the storage container may be used as a treatment container, and other storage containers 10 used for long-term storage of the grain 18. In contrast, in embodiments where the outlets 36 are selectively-removable from the storage container, they may be placed in the storage container 10 after filling of the storage container 10. (The grain spreader 30, if any, may be moved or removed to facilitate placement of the outlets 36 in some embodiments.)

Once the outlet(s) 36 are in place in the air space 20, treatment with ozone as discussed herein may be effected. Once treatment is complete, the outlet(s) 36 and any associated components of the ozone distribution system 34 may be removed from the storage container 10. The ozone distribution system 34 and the ozone generator(s) 32 may be transported or moved to a different storage container 10, and the entire ozone generation and distribution system used at the new storage container. Alternatively, only the ozone generator(s) 32 are moved, and the ozone distribution system 34 remains with the storage container 10 (and an ozone distribution system 34 is associated with each storage container 10 to be used for treatment). Thus, a single ozone generation system or ozone generation and distribution system can be used for treatment of the grain 18 in many storage containers 10 (e.g. serially, not simultaneously). The storage containers 10 need not be greatly modified in order to practice embodiments of the invention. In fact, many existing storage containers 10 need not be modified at all for practice of embodiments of the invention.

As discussed in our prior application, it may be advantageous to treat different batches of grain differently. For example, it can be advantageous to treat grain having different toxin levels differently. While the discussion below references various toxin levels or concentrations, it should be understood that the discussion also applies to odor levels, mold levels, insect levels or types of insects present, etc., and that the following discussion is provided merely as an example of one use of embodiments of the invention.

Take, for example, a sample of grain having an overall toxin level of approximately ten parts per million (ppm). In this example, it may be desired to reduce the toxin level to an amount less than two ppm. Of the grain in the grain sample, approximately 80% of the grain might have a toxin level of approximately one ppm, while 20% of the grain might have a much higher toxin level of forty ppm or more. These varying toxin levels reflect the varying growing conditions encountered during growth, harvesting, and storage of the grain. Rather than treat all the grain using ozone at identical amounts and times, embodiments of the invention embrace separation of the grain according to toxin levels and treating of the grain according to the separated toxin levels. In at least some instances, grain having higher levels of toxins has been found to be less dense (e.g. lighter, or having a lower specific gravity) than grain having lesser levels of toxins. This grain can thus be separated using a density separator, for example, and grains of different densities can be treated differently in different storage containers 10.

In the example recited above, the grain might be separated (such as by density) into two batches or streams of grain, where the first batch or stream has an average toxin level of approximately one ppm, and the other batch or stream has an average toxin level of approximately forty ppm. In this example, the first batch or stream of grain has a toxin level lower than the desired final toxin level, so this batch or stream of grain might receive only a minimal treatment with ozone or no treatment at all. In contrast, the second batch or stream might receive a significant ozone treatment, in a fashion similar to that described above.

After a desired treatment time, the toxin levels of the second batch or stream might be reduced to levels below the desired maximum level of two ppm, after which the grain could be used as desired, whether remixed with the first batch or stream of grain or not. As another example, however, the toxin levels of the second batch or stream may only have been reduced to an amount still higher than the desired maximum level, say six to eight ppm. In at least some embodiments, such treatment may be sufficient, as the grain from the two batches or streams may be remixed into a single batch or stream, where the average total toxin level is less than the desired maximum level. In this case, the final overall toxin level of the remixed grain might be between one and two ppm, below the cutoff level of two ppm for the desired use. Further reductions in toxin levels may be obtained by further or increased ozone treatment of one or both batches or streams of grain of the example.

To effect the different treatment of the various streams or batches of grain, the grain in each storage container 10 may be treated differently, thereby exposing the grain having higher toxin levels to more ozone than the grain having lower toxin levels is exposed to. One way to vary the exposure is to vary the concentration of ozone supplied to each storage container 10. Another way is to vary the air flow (and associated ozone flow) into each storage container 10. Still another way is to vary the time of exposure at a particular concentration. It will be appreciated that any or all of these or other methods for varying the exposure of the grain to ozone may be combined as advantageous and desired. In addition, any of the methods described in our prior application may also be used, with downdraft application of ozone instead of updraft application of ozone.

The present invention may be embodied in other specific forms without departing from its spirit or essential characteristics. The described embodiments are to be considered in all respects only as illustrative and not restrictive. The scope of the invention is, therefore, indicated by the appended claims, rather than by the foregoing description. All changes which come within the meaning and range of equivalency of the claims are to be embraced within their scope.

What is claimed and desired to be secured by Letters Patent is:

1. A method for downdraft ozone treatment of grain with minimal generation of ozone-related objectionable odors comprising:
    separating the grain based on density into a first, more dense batch having mycotoxins and a second, less dense batch having mycotoxins, where the first, more dense batch has less mycotoxins than the second, less dense batch;
    placing the second, less dense batch of the grain into a storage container;
    providing a negative air pressure at a bottom of a volume of the second batch of the grain in the storage container;
    placing ozone at a concentration exceeding 200 parts per million (ppm) in air above an upper surface of the volume of the second batch of the grain; and
    drawing the ozone down into the volume of the second batch of the grain using the negative air pressure for a treatment time sufficient to effectively reduce toxins in the second batch of the grain without causing significant ozone-related commercially-objectionable foreign odors in the second batch of the grain.

2. The method of claim 1, wherein the period of time is between approximately three and approximately six hours.

3. The method of claim 1, wherein the generated ozone concentration is between 200 and 800 ppm.

4. The method of claim 1, wherein the generated ozone concentration is approximately 500 ppm.

5. The method of claim 1, wherein generating the generated ozone concentration comprises:
    generating a first ozone concentration for a first period of time; and
    generating a second, decreased, ozone concentration that is lower than the first concentration for a second period of time.

6. The method of claim 5, wherein an air flow through the second batch of the grain is increased during the second period of time.

7. The method of claim 6, wherein increasing the air flow through the second batch of the grain causes the second ozone concentration to be lower than the first ozone concentration.

8. The method of claim 1, wherein the negative air pressure is generated by a fan.

9. The method of claim 1, wherein the second batch of the grain in the storage container and treated by the method comprises a height of at least approximately 40 feet high.

10. The method of claim 1, further comprising, after completion of ozone treatment, extracting the second batch of the grain from the storage container and mixing the second batch of the grain with the first batch of the grain.

11. A method for treating grain with ozone, the method comprising:
    separating grain based on density into a first, more dense batch having mycotoxins and a second, less dense batch having mycotoxins, where the first, more dense batch has less mycotoxins than the second, less dense batch;
    placing the second, less dense batch of the grain in a storage container having an aeration floor or perforated tubes along a bottom of the storage container;
    supplying a first concentration of ozone above an upper surface of the second, less dense batch of the grain at a concentration exceeding 200 ppm;
    drawing the ozone into the second, less dense batch of the grain for a first period of time;
    after the first period of time has passed, supplying a second concentration of ozone above the upper surface of the second, less dense batch of the grain for a second period of time, wherein the second concentration of the ozone is less than the first concentration of the ozone, thus producing ozone treated grain;
    removing the ozone treated grain from the storage container; and
    blending the ozone treated grain from the storage container with grain that has not been treated with ozone, thus producing a blend of grain having less than 2 ppm of mycotoxins.

12. The method of claim 11, wherein drawing the ozone into the second, less dense batch of the grain comprises providing negative air pressure through the aeration floor or the perforated tubes.

* * * * *